May 28, 1957  M. L. BENJAMIN ET AL  2,793,866

INDEXING DEVICE

Filed March 15, 1956  2 Sheets-Sheet 1

INVENTORS
MILTON L. BENJAMIN AND
STANLEY S. BENJAMIN
BY Oberlin & Limbach
ATTORNEYS.

May 28, 1957    M. L. BENJAMIN ET AL    2,793,866
INDEXING DEVICE

Filed March 15, 1956    2 Sheets-Sheet 2

INVENTORS
MILTON L. BENJAMIN &
STANLEY S. BENJAMIN
BY Oberlin & Limbach
ATTORNEYS.

United States Patent Office 2,793,866
Patented May 28, 1957

2,793,866

INDEXING DEVICE

Milton L. Benjamin and Stanley S. Benjamin, Cleveland, Ohio, assignors to Erickson Tool Company, Cleveland, Ohio, a corporation of Ohio Application March 15, 1956, Serial No. 571,641

8 Claims. (Cl. 279—5)

The present invention relates generally as indicated to an indexing device, and more particularly to an indexing device by which the chuck adapted to be mounted thereon may be accurately indexed for performing machining operations such as drilling or slotting of a workpiece held by the chuck at selected angular intervals.

It is a primary object of this invention to provide such an indexing device by which accurate rotary indexing may be effected and with which the accuracy may be maintained indefinitely even though parts thereof may progressively wear.

It is another object of this invention to provide an indexing device which is so constructed that the components which have anything at all to do with the indexing function either are adjustable or are rendered self-adjusting so as to eliminate radial and angular play with respect to the axis about which the spindle of the indexing device is adapted to be rotatably indexed.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

Figure 6:
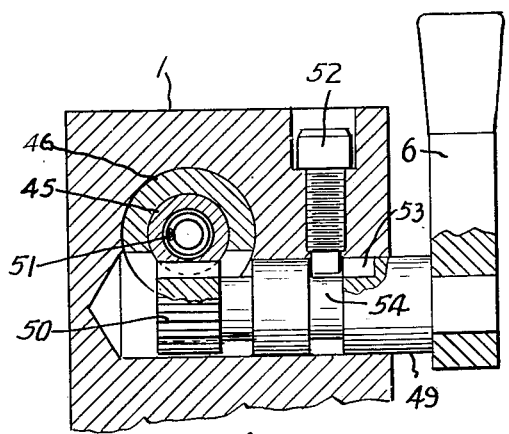
Figure 3:
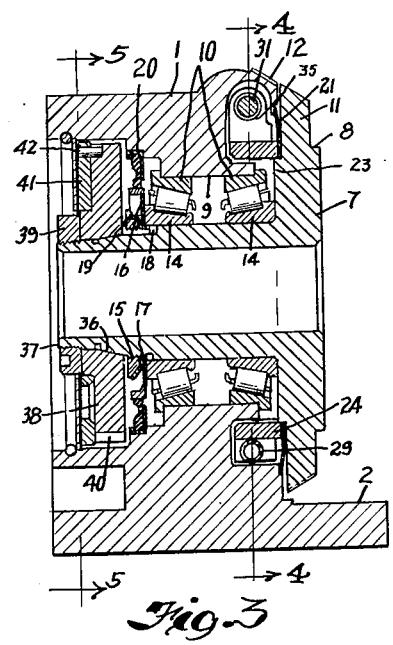
Fig. 3 is a vertical cross-section view taken substantially along the line 3—3, Fig. 1.
Figure 4:
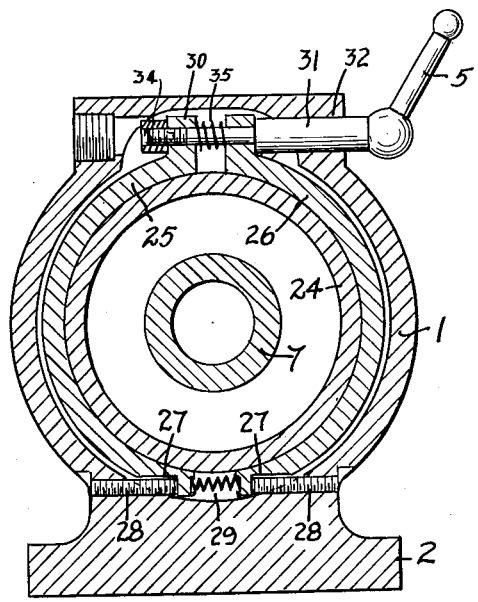
Figure 5:
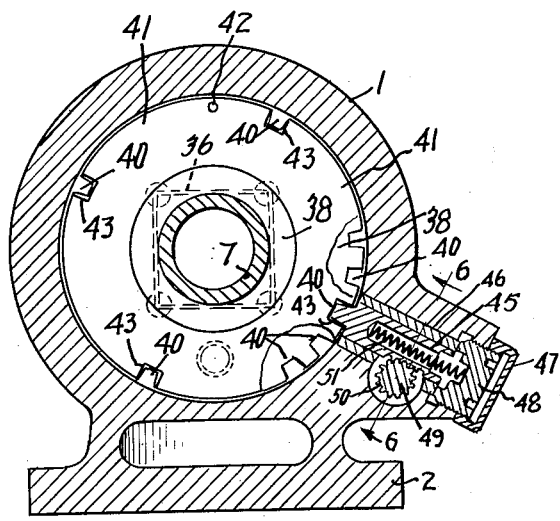

Figs. 4 and 5 are vertical cross-section views taken respectively along the lines 4—4 and 5—5 of Fig. 3; and Fig. 6 is a cross-section view of the indexing pin actuating mechanism, such section having been taken substantially along the line 6—6, Fig. 5.

Figure 1:
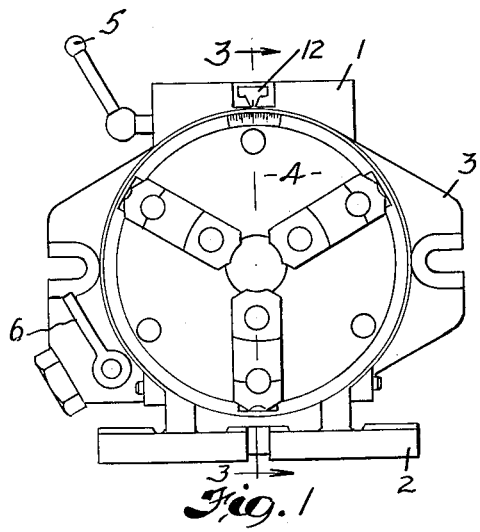
Fig. 1 is an end elevation view of a preferred form of indexing device according to this invention, such view being from the chuck end thereof.
Figure 2:
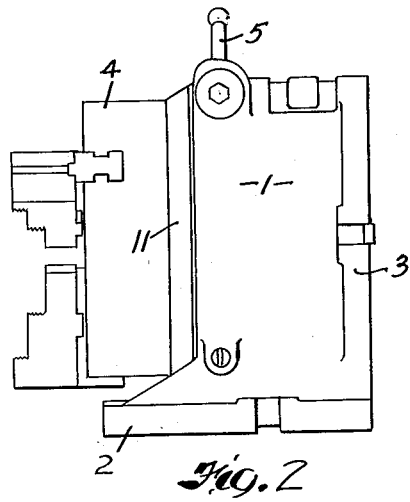
Fig. 2 is a side elevation view of the present indexing device as viewed from the righthand side of Fig. 1.

As best shown in Figs. 1 and 2, the indexing device herein comprises a housing 1 which is formed with perpendicularly related mounting flanges 2 and 3 by which the housing may be mounted either in horizontal position as shown in the drawings, or in vertical position.

Adjacent one end of said housing is a chuck 4 herein shown as being a self-centering, three-jaw chuck which is adapted to hold a workpiece for angular indexing about the axis of the housing 1 and chuck 4.

As will be described in detail later, the turning of the handles 5 and 6 respectively releases a brake and withdraws an indexing pin so that the chuck 4 may be rotated from one indexed position to the next, the indexing pin preferably being spring-actuated so as to drop into the next notch of an index plate, whereupon the handle 5 may be turned to set the brake and thereby hold the chuck 4 in its newly indexed position without imposing torque loads on the indexing pin.

Referring now in detail to the internal construction of the indexing device, reference is made to Figs. 3–6, the chuck 4 having been omitted in Fig. 3, since the particular form of the chuck and its mounting does not constitute any part of this invention except to the extent that the indexing spindle 7 may be provided with a locating boss 8 or the equivalent which assures that the chuck and spindle axes will be coaxial.

The housing 1 is formed with a bore 9 therethrough in which the outer races 10 of a pair of axially spaced-apart and oppositely disposed tapered roller bearings are fixedly supported. The indexing spindle 7 is preferably tubular, as shown, to accommodate elongated workpieces in the form of bar stock, for example, and said spindle is provided with a flange 11 at one end to which the chuck 4 is adapted to be mounted.

The beveled outer edge of said flange 11 is graduated in degrees for cooperation with a pointer 12 mounted on the correspondingly beveled surface of the housing 1, the pointer 12 and flange 11 graduations being flush and in the normal line of sight of the operator to facilitate accurate setting of angles other than those provided by a preformed index plate.

The inner races 14 of the tapered roller bearings are preferably a snug or push fit on the spindle 7 and adjustable screw means are provided to axially draw said inner races toward each other whereby all lateral play of the spindle 7 with reference to the housing 1 is eliminated.

Said screw means is here shown as comprising a nut 15 which is threaded onto the spindle 7 and which presses a ring 16 against the end of the adjacent inner race 14, the other inner race 14 being disposed against the inner face of flange 11.

A lock ring 17 has an inner portion engaged in a keyway 18 formed on the spindle 7 and is formed with a bendable lug 19 which is adapted to be bent to engage in one of a plurality of slots in nut 15 to hold the latter against rotation in either direction. Should any looseness develop in the bearings, it is a simple matter to straighten out the lug or lugs 19 and tighten the nut 15 to eliminate such looseness, whereupon the lug or lugs 19 may be rebent.

Spanning the gap between the housing 1 and the pressure ring 16 is a sealing ring 20 which retains lubricant in the bearings and also prevents ingress of foreign matter thereinto. The other end of the bearing chamber is sealed by means of a dished spring washer 21 (as of spun brass) which, when installed, is partly flattened in the axial direction so as to yieldably engage the housing 1 to thus provide a seal against ingress of foreign matter into the bearing chamber.

Press fitted or otherwise permanently mounted on an inwardly extending boss 23 of the spindle flange 11 is a brake drum 24 which has a cylindrical outer surface adapted to be frictionally engaged by the inner cylindrical surfaces of a pair of brake shoes 25 and 26.

The brake shoes 25 and 26, as best shown in Fig. 4, are each formed with a step 27 at its lower end against which an adjustable screw 28 abuts. A spring 29 is compressed between the lower ends of said shoes 25 and 26 to maintain contact of the steps 27 with the ends of the respective screws 28. Normally, the screws 28 will be turned inwardly so that the inside cylindrical surfaces adjacent the lower ends of the brake shoes 25 and 26 are just about touching the brake drum 24.

The upper ends of said shoes 25 and 26 are formed with ears 30 through which the reduced end portion of a shaft 31 loosely extends, the shaft 31 being rotatably supported in a cross-bore 32 of the housing 1 and being provided with a suitable operating handle 5.

The one brake shoe 25 has keyed thereto a nut 34 in which the threaded end of said shaft 31 is engaged whereby when said shaft is turned in one direction, the brake shoes 25 and 26 are drawn together to thus grip the brake drum 24 therebetween to prevent rotation of the spindle 7. When the shaft 31 is turned in the opposite direction, the brake shoes 25 and 26 are separated under the influence of the spring therebetween 35. The brake mechanism just described is, as can be seen, of the floating type whereby it has no tendency to laterally or axially shift the spindle 7.

The end of the indexing spindle which is opposite to the flange 11 thereof is formed with a tapered polygonal portion 36, herein a tapered square, which terminates in a threaded portion 37. The index plate 38 is formed with a complementary tapered square opening therethrough and is adapted to be tightly wedged on the spindle 7 by means of the nut 39 which is threaded on said spindle and which forces the index plate toward the right as viewed in Fig. 3. Accordingly, there can be no lateral or angular play between the index plate 38 and the spindle 7.

Said index plate 38 is formed with a plurality of peripheral notches 40, the opposite sides of which converge inwardly at an included angle of 12°, for example.

In the event that it is desired to index the spindle 7 through angles which are multiples of the angular spacing between the index plate notches 40, there may be mounted on the index plate 38 a blankout plate 41 as by means of screws or the like, and said blankout plate may have a locating pin 42 engaged in one notch 40. The notches 43 in the blankout plate 41 are preferably wider than the notches 40 in the index plate 38 but are arranged to register with the desired ones of the index plate notches 40. Thus, the index pin 45 which has a tapered end corresponding to the tapered notches 40 and which extends axially across the blankout plate 41 and the index plate 38, can only enter those notches 40 of the index plate 38 which are in register with the notches 43 of the blankout plate 41.

By reason of the provision of a wedge-shaped end on said index pin 45 which clears the bottoms of notches 40, there is no clearance at the sides, and thus no rotary play to affect the accuracy even if the notches or the end of the index pin 45 wear.

The index pin 45 is axially slidable in a tubular bushing 46 which is exteriorly tapered and which is fitted into a radially disposed tapered bore in the housing 1. Thus, should looseness develop between the index pin 45 and the bushing 46, all that it is necessary to do is to remove the cap 47 and tighten the adjusting screw 48.

It has been found that, even though the bushing 46 is in the form of an unslotted bronze tube of about ¼" wall thickness, the bore in the bushing may be reduced in diameter as much as several thousandths of an inch, if necessary. Accordingly, periodically said screw 48 may be screwed in slightly to take up any wear of the index pin 45 or of the bore in the bushing 46. With lateral play thus eliminated, there cannot be any angular looseness of the index plate 38 when in an indexed position.

Moreover, as previously described, the brake mechanism (drum 24 and shoes 25—26) securely locks the spindle 7 so that none of the torque load on the spindle 7 will be transferred back to the index pin 45. It is, of course, to be understood that the brake may be used to lock the spindle 7 in any desired angular position irrespective of whether or not a notch 40 of the index plate 38 registers with the end of the index pin 45.

The mechanism for withdrawing the index pin 45 out of engagement with the index plate 38 and blankout plate 41 is here shown as comprising a shaft 49 provided with the handle 6 at one end and with a gear 50 at the other end in mesh with the gear rack formed on the side of the index pin 45.

Thus, when the shaft 49 is rotated, the index pin 45 is moved radially outward, and when the handle is released, the spring 51 compressed between the index pin 45 and the screw 48 forces the index pin 45 radially inward to engage in the next notch 40 as the spindle 7 is rotated. Should it be desired to hold the index pin 45 in the retracted or withdrawn position, the shaft 49 is pushed inwardly, whereupon the end of the screw 52 engages in an axially extending slot 53 in the shaft 49.

Thus the shaft 49 is prevented from being rotated under the influence of the spring 51 tending to move the index pin 45 inwardly. The end of said screw 52 fits in a peripheral groove 54 of the shaft 49 to hold said shaft from axial movement while rotated except in this one position wherein the groove 54 is intersected by the axial slot 53.

Summarizing, it can be seen that the present indexing device is easy to be set, by reason of the provision of graduations which are on beveled surfaces which are in the normal line of sight of the operator; that the spindle-housing bearing mechanism is protected not only by the oil seal 20 but also by the dished spring washer 21 which has the additional function of creating a slight drag on the rotary indexing movement which has been found to be desirable; that a floating brake mechanism 24, 25, 26 has been provided so as not to tend to disturb the coaxial location of the spindle 7 and housing 1 axes; that the provision of oppositely disposed tapered roller bearings with the take-up means ensures playless rotatable mounting of the spindle 7; that the interengaging tapered polygonal surfaces of the index plate 38 and spindle 7 ensures a playless connection; that the wedge-shaped end of the index pin 45 engaging in wedge-shaped notches 40 of the index plate 38 ensure indexing without play; and that the take-up on the tapered bushing 46 ensures playless slidable mounting of the index pin 45.

Accordingly, the present indexing device is foolproof and has an indefinite life, since the wear of any parts thereof which have any thing to do with the indexing function may be adjusted to compensate for wear or else the wear of parts is automatically compensated for.

Other modes of applying the principle of the invention may be employed, change being made as regards the details described, provided the features stated in any of the following claims, or the equivalent of such, be employed.

We therefore particularly point out and distinctly claim as our invention:

1. An indexing device comprising a housing; coaxial, oppositely disposed tapered roller bearings having outer races fixed in said housing; an indexing spindle extending through said bearings and journalled thereby for rotation relative to said housing; take-up means on said spindle to draw the inner races of said bearings axially toward each other to eliminate lateral and axial play between said housing and said spindle; a peripherally toothed index plate non-rotatably mounted on said spindle; an index pin movably carried by said housing for movement into engagement in an interdental space of said plate to position said spindle in a selected rotary position; and brake means in said housing adapted to engage said spindle to lock the same in such selected rotary position and thereby relieve said index pin of torque loads imposed on said spindle.

2. The indexing device of claim 1 characterized in the provision of a radially disposed, exteriorly tapered bushing in which said index pin is axially slidably mounted; said bushing being fitted into a radially disposed and correspondingly tapered bore of said housing; and means for forcing said bushing axially into such tapered bore to radially contract said bushing and thereby eliminate lateral play between said index pin and said bushing.

3. The indexing device of claim 1 characterized in the provision of relatively tapered wedge faces on said index pin and the interdental spaces of said index plate to eliminate radial clearance therebetween; a radially disposed, exteriorly tapered bushing in which said index pin is axially slidably mounted; said bushing being fitted into a radially disposed and correspondingly tapered bore of said housing; and means for forcing said bushing axially into such tapered bore to radially contract said bushing and thereby eliminate lateral play between said index pin and said bushing.

4. The indexing device of claim 1 wherein said brake means comprises a circular brake drum fixedly mounted on said spindle in a position coaxial with said bearings; a pair of brake shoes non-rotatably mounted in said housing in surrounding relation to said drum; and means for relatively moving said shoes into and out of frictional engagement with said drum.

5. The indexing device of claim 4 wherein the braking surfaces of said drum and said shoes are of shape to eliminate imposition of axial thrust load on said spindle.

6. The indexing device of claim 1 wherein a dished metal washer has radially spaced-apart circular areas which yieldably engage said housing and said spindle respectively to form a seal against ingress of foreign matter into said bearings.

7. The indexing device of claim 1 wherein said spindle is formed with a tapered square portion which fits into a complementary tapered square opening in said index plate to thus provide a secure, playless mounting of said plate on said spindle.

8. The indexing device of claim 1 wherein a blankout plate is mounted on said index plate, said blankout plate having peripheral notches in register with fewer than all of the interdental spaces of said index plate and being operative to allow said index pin to enter only the spaces which are in register with the notches of said blankout plate.

No references cited.